United States Patent
Peebler

(10) Patent No.: US 8,732,578 B2
(45) Date of Patent: *May 20, 2014

(54) SYSTEM AND METHOD FOR USING A CURSOR TO CONVEY INFORMATION

(75) Inventor: Simeon C. Peebler, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 174 days.

This patent is subject to a terminal disclaimer.

(21) Appl. No.: 13/158,015

(22) Filed: Jun. 10, 2011

(65) Prior Publication Data

US 2011/0239165 A1    Sep. 29, 2011

Related U.S. Application Data

(63) Continuation of application No. 11/608,515, filed on Dec. 8, 2006, now Pat. No. 8,006,183.

(51) Int. Cl.
*G06F 3/048* (2013.01)

(52) U.S. Cl.
USPC .......................... 715/711; 715/715

(58) Field of Classification Search
USPC .................................. 715/711, 715
See application file for complete search history.

(56) References Cited

U.S. PATENT DOCUMENTS

| | | | |
|---|---|---|---|
| 4,745,405 A | 5/1988 | Himelstein et al. | |
| 5,196,838 A | 3/1993 | Meier et al. | |
| 5,287,448 A | 2/1994 | Nicol et al. | |
| 5,710,897 A | 1/1998 | Schneider | |
| 5,801,704 A | 9/1998 | Oohara et al. | |
| 5,898,432 A | 4/1999 | Pinard | |
| 6,025,844 A | 2/2000 | Parsons | |
| 6,133,918 A | 10/2000 | Conrad et al. | |
| 6,337,702 B1 | 1/2002 | Bates et al. | |
| 6,362,840 B1 | 3/2002 | Burg et al. | |
| 6,535,230 B1 | 3/2003 | Celik | |
| 6,563,514 B1 | 5/2003 | Samar | |
| 6,772,132 B1 | 8/2004 | Kemp, II et al. | |
| 6,809,720 B2 | 10/2004 | Malamud et al. | |
| 6,874,126 B1 | 3/2005 | Lapidous | |
| 6,934,737 B1 | 8/2005 | Tang et al. | |
| 6,938,011 B1 | 8/2005 | Kemp, II et al. | |
| 7,127,424 B2 | 10/2006 | Kemp, II et al. | |

(Continued)

OTHER PUBLICATIONS http://msdn.microsoft.com/en-us/library/ms644959(VS.85,printer).aspx, viewed on Jan. 28, 2009.

(Continued)

*Primary Examiner* — Doon Chow
*Assistant Examiner* — Le Nguyen
(74) *Attorney, Agent, or Firm* — McDonnell Boehnen Hulbert & Berghoff LLP

(57) ABSTRACT

Methods and systems are provided for the controlled cursor's behavior. According to one example method, any desired data may be linked to a cursor and a desired cursor behavior could be defined to convey the linked data using the cursor. When a change in the linked data is detected, the example method includes using the desired cursor behavior to convey the changed data independent of a location where the cursor is placed on a screen.

13 Claims, 6 Drawing Sheets

(56) References Cited

U.S. PATENT DOCUMENTS

| | | |
|---|---|---|
| 7,228,289 B2 | 6/2007 | Brumfield et al. |
| 7,389,268 B1 | 6/2008 | Kemp, II et al. |
| 7,509,283 B2 | 3/2009 | Friesen et al. |
| 8,230,366 B2 * | 7/2012 | Chaudhri ............... 715/859 |
| 2002/0010626 A1 | 1/2002 | Agmoni |
| 2002/0054172 A1 | 5/2002 | Berman et al. |
| 2002/0057285 A1 | 5/2002 | Nicholas, III |
| 2003/0142123 A1 | 7/2003 | Malamud et al. |
| 2003/0142133 A1 | 7/2003 | Brown et al. |
| 2005/0216913 A1 | 9/2005 | Gemmell et al. |
| 2005/0267367 A1 | 12/2005 | Kerby et al. |
| 2006/0036971 A1 * | 2/2006 | Mendel et al. ............ 715/856 |
| 2006/0048067 A1 | 3/2006 | DeSpain et al. |
| 2006/0136833 A1 | 6/2006 | Dettinger et al. |
| 2006/0179415 A1 | 8/2006 | Cadiz et al. |
| 2006/0218501 A1 | 9/2006 | Wilson et al. |
| 2008/0120569 A1 * | 5/2008 | Mann et al. ............... 715/792 |
| 2010/0211886 A1 * | 8/2010 | Forstall et al. ........... 715/745 |

OTHER PUBLICATIONS http://msdn.microsoft.com/en-us/library/ms644986(VS.85,printer).aspx, viewed on Jan. 28, 2009.

http://msdn.microsoft.com/en-us/library/ms644988(VS.85,printer).aspx, viewed on Jan. 28, 2009.

http://msdn.microsoft.com/en-us/library/bb760252(VS.85,printer).aspx, viewed on Jan. 28, 2009.

http://msdn.microsoft.com/en-us/library/bb776779(VS.85,printer).aspx, viewed on Jan. 28, 2009.

http://msdn.microsoft.com/en-us/library/ms648390(printer).aspx, viewed on Jan. 28, 2009.

http://msdn.microsoft.com/en-us/magazine/cc301524(printer).aspx, viewed on Jan. 28, 2009.

http://social.msdn.microsoft.com/Forums/en-US/csharpgeneral/thread/e66cd9b4-93a9-4c6d-b61a-06013981e3b0/, viewed on Jan. 28, 2009.

* cited by examiner

SYSTEM AND METHOD FOR USING A CURSOR TO CONVEY INFORMATION

CROSS-REFERENCE TO RELATED APPLICATIONS

This application is a continuation of U.S. patent application Ser. No. 11/608,515, entitled "System and Method for Using a Cursor to Convey Information," filed Dec. 8, 2006, now U.S. Pat. No. 8,006,183, the contents of which are fully incorporated herein by reference.

TECHNICAL FIELD

The present invention is directed to conveying information using a cursor. More specifically, the present invention is directed to a system and method for using a cursor to convey information that may assist a trader in making trading decisions in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions.

Electronic trading is generally based on a host exchange, one or more computer networks, and client devices. In general, the host exchange includes one or more centralized computers to form the electronic heart. Its operations typically include maintaining an exchange order book that records unexecuted orders, order matching, providing price and order fill information, and managing and updating a database that records such information. The host exchange is also equipped with an external interface that maintains uninterrupted contact to the client devices and possibly other trading-related systems.

Using client devices, traders link to the host exchange through one or more networks to trade tradeable objects. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

A network is a group of two or more computers or devices linked together in any fashion, which may be characterized by topology, protocol, and architecture. For example, some market participants may link to the host through a direct network connection such as a T1 or ISDN. Some participants may link to the host exchange through direct network connections and through other common network components such as high-speed servers, routers, and gateways that allow a trader to connect to an electronic exchange. The Internet, a well-known collection of networks and gateways, can be used to establish a connection between the client device and the host exchange. There are many different types of wired and wireless networks and combinations of network types known in the art that can link traders to the host exchange.

A client device may include computers such as personal computers, laptop computers, hand-held computers, and so forth that have network access. A client device usually consists of a personal computer, laptop, or workstation that has a Microsoft Windows-type or some other type of the operating system that provides a pointing device and a graphical interface based on windowed regions displayed on the screen. Currently, one of the most common pointing devices is a mouse that typically includes a wheel positioned between the left and right buttons. Other types of pointing devices may also be used such as keyboard cursors or trackballs, just to name a few. Regardless of the actual pointing device used, a cursor, also often referred to as a pointer, is displayed on a screen. In relation to graphical user interfaces, a cursor is a visible and moving object or pointer that a user may control with a mouse, touch pad, or a similar device. The relative movement of the on-screen cursor is controlled by the relative movement of the pointing device by the user. The user may use the pointing cursor and special input buttons to select a particular item displayed on a screen. Typically, a pointing cursor is an arrow and a text entry position cursor is a blinking underscore or a vertical bar. However, different cursor formats are used as well, and many operating systems allow a user to choose another appearance for the cursor. In a trading environment, a cursor, among other functions, may be used to highlight information, set order parameters, send orders, cancel orders, and so on.

In addition to typical uses of the cursor, some systems provide information cursors, often referred to as tool tip cursors. Tool tip cursors are mostly used in interactive computer environments where a user may receive a help message about an icon or yet some other object by positioning a pointer with a mouse on the computer's display over the icon about which the information is desired. For example, tool tip icons are described in U.S. Pat. Nos. 6,809,720 and 5,287,448.

Considering that the use of a cursor to manipulate any window displayed on a screen is inevitable, it would be beneficial to provide additional uses for a cursor in electronic trading and other environments.

SUMMARY

The example embodiments are directed to a system and methods for controlled cursor behavior. In a typical environment, a cursor only takes on the behavior of an application which is the present application of focus or an application corresponding to a window which lies visibly directly beneath the cursor's hotspot, typically, the tip of the cursor's arrow. According to the example embodiments, the cursor's behavior can be controlled regardless of the cursor's state with respect to the application focus, a location of the cursor in relation to windows or interfaces displayed on a screen, or an operating system being run.

The controlled cursor behavior embodiments are not limited to any specific application; however, according to one example embodiment that will be described in greater detail below, the behavior of the cursor may be based on data linked from a trading application. In such an embodiment, the cursor may respond to changes in the linked data provided by the trading application regardless of what application or operating system is used at any point in time. According to one example embodiment, a user may link data from a trading application, and the linked data may be displayed in relation to the cursor independent of a location where the cursor is displayed on one or more screens and independent of an application being focused on by a user. For example, the displayed data may correspond to market data that a user may view via a first window displayed on a screen. Then, when the user closes the window or moves the cursor to another window displayed on the screen even if the second window corresponds to an application different from the trading application, the linked data may remain displayed in relation to the cursor regardless of what actions are taken by the user. Additionally, as any changes are detected in the linked data, the displayed data may dynamically react to the detected changes so that a user may view the data as the changes occur.

The behavior of a cursor according to the example embodiments could be user-configurable. As will be described later, to convey desired information via a cursor, data could be textually/graphically displayed in relation to a cursor, audio signals could be played, or the combination thereof could be used as well. Additionally, the cursor's format could be used to convey additional or the same information to a user. For example, a cursor's color or shape could be altered to alert a user of a change in a value or some other event linked to the cursor. Alternatively, the cursor could start flashing or yet react to changing data in some other way depending on the system configuration.

In one example embodiment, the information displayed in relation to a cursor could be configured to assist a user in making his trading decisions. Thus, the displayed data could be based on trader-related data, such as a trader's net position or profit data, market related data, such as the current inside market corresponding to a selected tradeable object, or news related data, for example. As will be explained in greater detail below, different types of data could be linked and displayed in relation to a cursor as well.

While the example embodiments are described herein with reference to illustrative embodiments for particular applications, it should be understood that the example embodiments are not limited thereto. For instance, it should be understood that the system and methods of the present embodiments can be applied by other software applications outside of the trading environment. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

BRIEF DESCRIPTION OF THE DRAWINGS

Example embodiments are described herein with reference to the following drawings, in which.

DETAILED DESCRIPTION

I. A First Example Trading System

Figure 1:
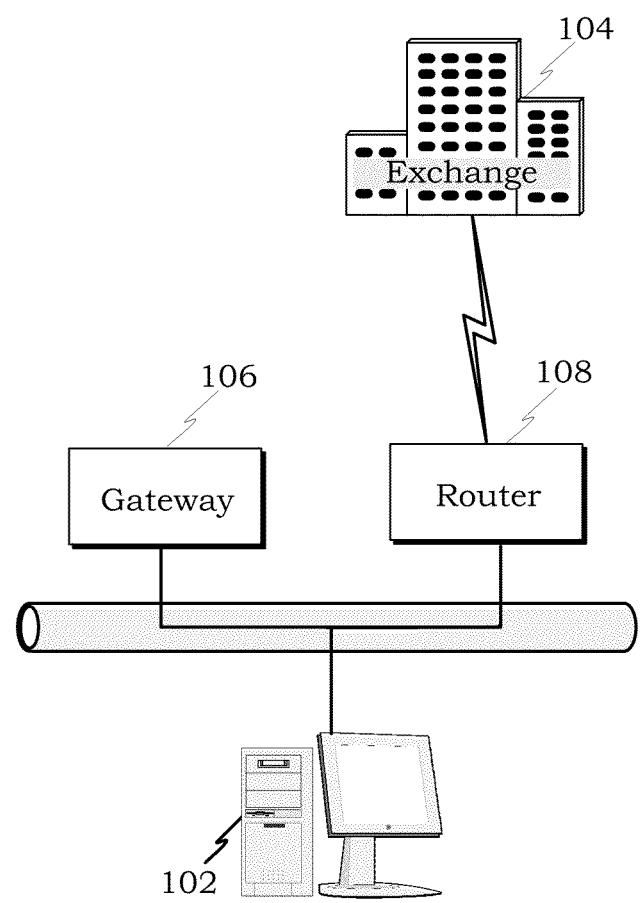
FIG. 1 illustrates an example electronic trading system in which the example embodiments may be employed.

FIG. 1 illustrates an example electronic trading system in which the example embodiments may be employed. However, it should be understood that the example embodiments could be equally applicable in different embodiments and in relation to different systems as well, such as by other computer programs or systems that do not necessarily relate to electronic trading (e.g., operating systems, gaming systems, and/or other software applications). In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchange 104 can offer other types of market information such as the last traded price (LTP), the last traded quantity (LTQ), and order fill information.

The computer employed as the client device 102 generally can range from a handheld device, laptop, or personal computer to a larger computer such as a workstation and multiprocessor. An illustrative personal computer may use Pentium™ microprocessors and may operate under a Windows operating system, or yet may use some other microprocessor or operating system. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. An illustrative gateway 106 computer may use Pentium™ microprocessors and may operate under a Windows (server or workstation) operating system, or yet some other system. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
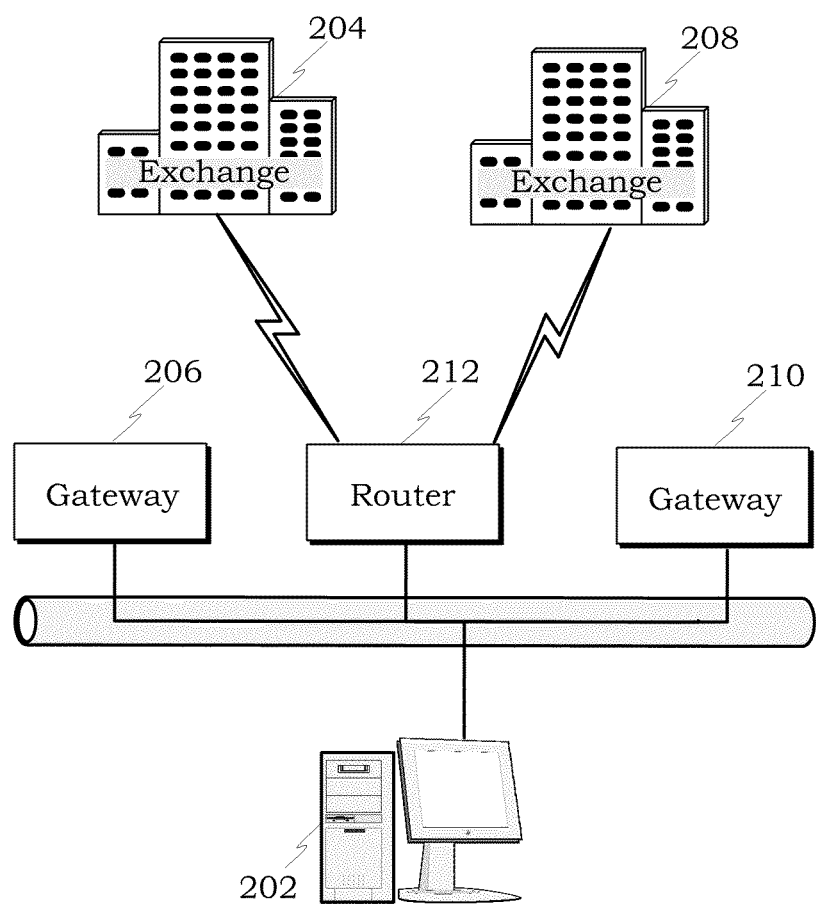
FIG. 2 illustrates another example trading system that uses similar computer elements as shown in FIG. 1, in which, the example embodiments may be employed to trade at multiple electronic exchanges.

FIG. 2 illustrates another example trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, or any other physical medium with patterns of holes, a RAM, a PROM, an EPROM, a FLASH-EPROM, and any other memory chip or cartridge, or any other medium from which a computer can read.

When a client device receives market information or other data, such as news, or charting data, and order related information from an exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an exchange, cancel orders, change orders, query an exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

While the example embodiments could be implemented in relation to many different environments and many different applications, they will be described in relation to a trading application and a trading screen. Details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. Pat. No. 6,772,132, entitled "Click Based Trading With Intuitive Grid Display of Market Depth," filed on Jun. 9, 2000, U.S. Pat. No. 6,938,011, entitled "Click Based Trading with Market Depth Display" filed on Jun. 9, 2000, U.S. Pat. No. 7,127,424 entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIGS. 1 and 2 could also be placed using any other trading application as well. Additionally, the preferred embodiments are not limited to any particular product that performs translation, storage, and display function.

Figure 3:
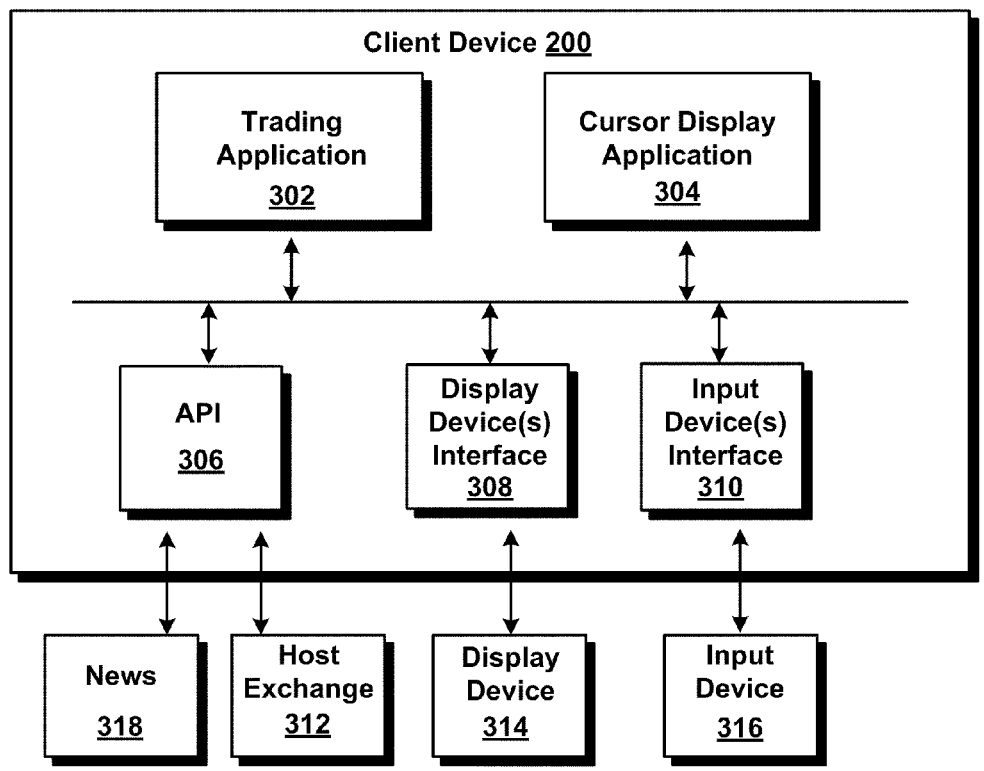
FIG. 3 is a block diagram illustrating an example trading station.

FIG. 3 is a block diagram illustrating an example client device 300, which may be similar to the type of client devices 102 and 202 shown in FIGS. 1 and 2. The client device 300 can be any particular type of computing device, examples of which were enumerated above. According to the preferred embodiments, the client device has a trading application 302 and a cursor display application 304, both of which could be stored in a memory unit. While the cursor display application 304 is shown as a separate application, it should be understood that it could also be incorporated into the trading application 302 as well, or yet some other application when the example embodiments are used in environments other that the trading related environment.

The trading application 302, when executed, may arrange and display market information in many different ways, depending on how the trader prefers to view the information. Cursor display application 304 can implement the embodiments for the controlled cursor's behaviors, the embodiments of which will be described in greater detail below. Preferably, the trading application 302 and the cursor display application 304 have access to market information through an application programming interface ("API") 306, and the trading application 302 can also forward transaction information to the host exchange 312 via the API 306. Also, the trading application 302 and/or the cursor display application 304 could receive other types of data, such as news related data 318, through the API 306 from outside sources.

Additionally, the trading application 302 and the cursor display application 304 could receive signals from an input device 316 via an input device interface 310, and can be given the ability to send signals to a display device 314 via a display device interface 308, the embodiments of which will be described below.

IV. Configuration of Cursor Indicators

According to the example embodiments described in greater detail below, a user may link data to be displayed in relation to a cursor, and the data may remain linked to the cursor independent of a location where the cursor is displayed on one or more screens being used by a user. The data may remain linked to the cursor independent of a location of the cursor on an interface corresponding to a single application, independent of a location of the cursor on interfaces corresponding to more than one application, and/or independent of an operating system being used.

It should be understood that different data could be linked to a cursor. In the embodiments described herein that relate to a trading environment, the linked data could be market related data, trader related data, chart related data, news data, data determined based on user-defined equations or formulas, or the combination of the specified or yet different data types.

However, as the example embodiments are not limited to the trading environment, the linked data could be application or environment specific and could include many different data types (e.g., the time, the weather forecast, news items, items related to electronic gaming, and so on).

The data linked to a cursor may trigger different operational modes to be used in relation to the cursor. In one embodiment, the linked data may be displayed in relation to the cursor in a textual and/or graphical format. For example, a text box could be displayed in relation to the cursor to convey the linked data to a user. Alternatively, the linked data could trigger changes in the format of the cursor. For example, different colors/shapes could be used to represent different events/data types or to alert a user of a change in the linked data, or the cursor could flash upon detecting certain data. Different embodiments are possible as well such as a combination of the above behaviors. Additionally, as the linked data changes, the changes may be conveyed to a user based on the configuration of the cursor's behavior.

According to one embodiment, a user could control the cursor's behavior and data that is linked to the cursor. However, in an alternative embodiment, the user could be given less flexibility, and the cursor configuration could be hard-coded. Yet, according to another embodiment, some elements of the cursor configuration could be hard-coded with some flexibility remaining in the hands of the user.

Figure 4:
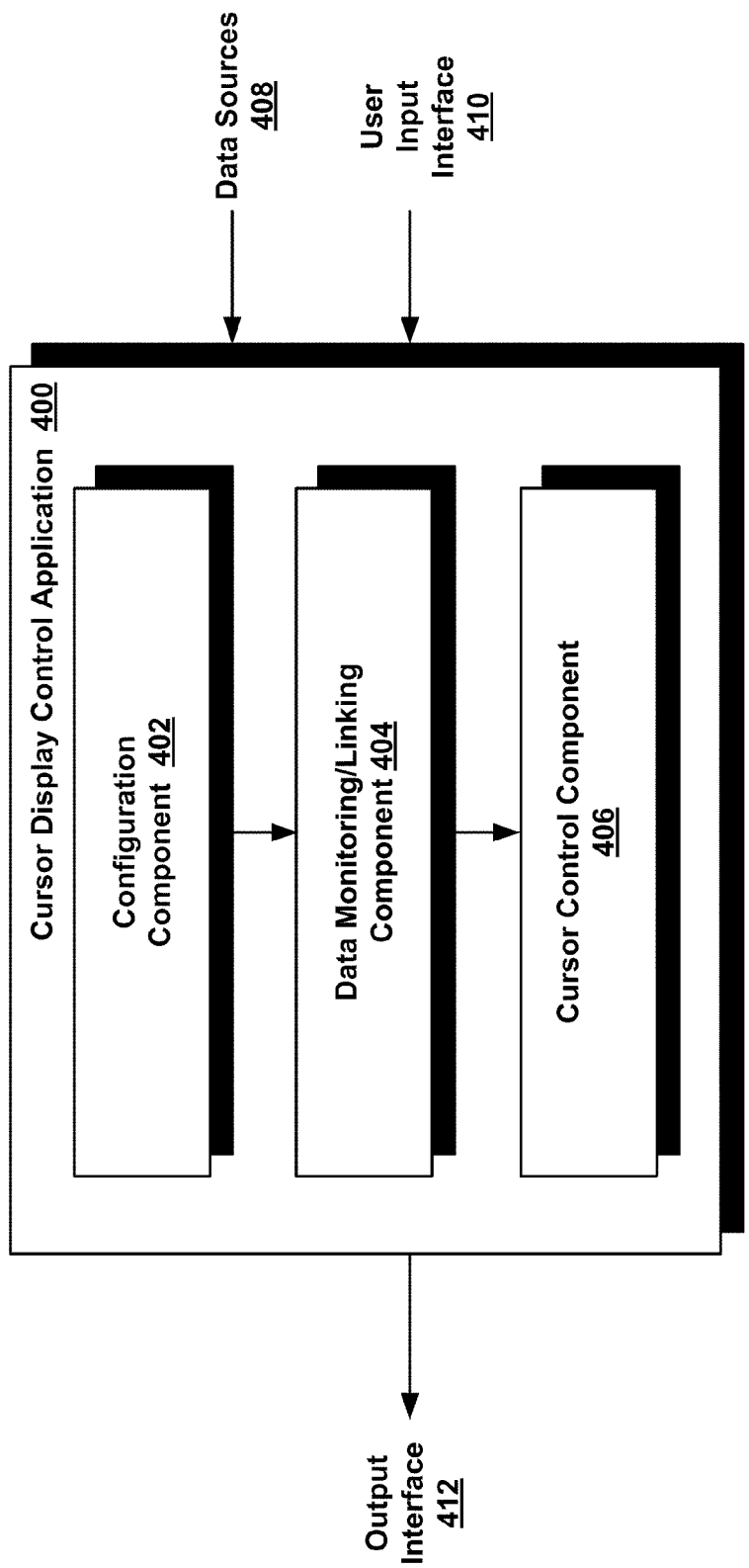
FIG. 4 is a flow diagram illustrating an example method for cursor configuration according to an example embodiment.

FIG. 4 is a block diagram illustrating a cursor display control application 400 according to one example embodiment. The cursor display control application 400 includes a configuration component 402, a data monitor/linking component 404, and a cursor control component 406. The components 402, 404, and 406 may include software and/or hardware elements to perform their functions. However, it should be understood that the cursor display control application 400 could include more or fewer components than those shown in FIG. 4. Also, the illustrated components could be combined with the components of the trading application of a particular trading station, as mentioned above.

The configuration component 402 provides configuration mechanisms that allow a user define desired operation and the cursor's behavior according to the example embodiments described herein. As mentioned earlier, the cursor's behavior may be linked to the cursor regardless of the cursor's state with respect to a currently used application, an operating system being run, or a location of the cursor with respect to one or more windows displayed on a screen.

The configuration component 402 may receive the configuration data from a user via a user input interface 410. The configuration means could include pull-down menus, graphical interfaces, or the combination thereof. Regardless of the configuration means used, the configuration component 402 may allow a user, among other things, select desired information to be displayed in relation to a cursor, a desired display format for a cursor, and the cursor's behavior as the cursor is moved in relation to different windows displayed on one or more screens, or as the information displayed in relation to the cursor changes. As mentioned earlier, in an alternative embodiment, rather than giving a user an option to configure the mentioned elements, some of the flexibility may be taken away by hard-coding some or all available option(s).

The data monitor and linking component 404 enables the cursor display control application 400 to be linked to one or more other applications that may provide data to be used to control the cursor's behavior. Once the desired data is specified via the configuration component 402, the data monitor/linking component 404 may communicate with outside applications, such as a trading application, to request the desired data, as shown at 408. According to one example embodiment, once the initial data is received, the data monitor/linking component 404 may be configured to monitor the received data for changes and to make calculations based on the received data, if needed. Alternatively, the system could be configured such that a data source, e.g., an outside application, may perform any necessary calculations and provide the processed data to the cursor display control application 400. For example, if data related to a trader's net position were to be displayed along a cursor, a trading application could perform necessary calculations and provide the updates to the cursor display control application 400 only upon detecting a change in the trader's net position. It should be understood that different system configurations are possible as well, with some processing of data being performed at the cursor display control application 400 and some at one or more other applications that provide data to be used in relation to a cursor.

The cursor control component 406 manages and controls the format of a cursor and any data that is displayed in relation to the cursor. More specifically, the cursor control component 406 may control the display of the selected data in relation to a cursor as well as the cursor's behavior regardless of a cursor's location on a screen, an application in use, and/or an operating system being run. In an embodiment where the selected information is displayed in relation to a cursor, it should be understood that when the cursor moves, the displayed data moves with the cursor.

Additionally, a user may configure the cursor's behavior such that the information displayed in relation to a cursor may be context sensitive to the cursor's location with respect to interfaces or windows that are displayed on a screen. For example, if a cursor is displayed in relation to a trading interface, the information associated with the cursor could be displayed such that it does not obstruct the view of the underlying market data. To do that, any textual or graphical information could be transparent, and a user could control the transparency level. In such an embodiment, the cursor control component 406 could monitor the cursor's location on a screen, and timely change the format and other display-related parameters related to the displayed information. Additional details as to the format and display configurations will be described in greater detail below.

A. Basic Operation

Assuming the flexibility is provided by the system, a user may link data to a cursor and define the desired cursor's behavior. According to one example embodiment, the cursor behavior may be linked to data that is provided by any desired application. For example, the user may link the cursor's behavior to a trading application. In such an embodiment, the cursor's behavior may depend on trader-related data, market related data, news, some other data, or yet the combination thereof. As mentioned earlier, the desired cursor behavior may involve displaying linked market data in relation to the cursor, or changing the format of the cursor as the changes in the linked data are detected. Linking the data may include any mechanism for defining the cursor's behavior, and by the way of illustration, the mechanisms may include selecting options provided by a menu-based system. If flexibility is not provided by the system (e.g., such as when the option is hard-coded into the system), then the predefined data is automatically linked to the cursor.

As the cursor is moved on the screen, the cursor may be controlled by the predefined behavior. The predefined cursor's behavior could be applicable globally, e.g., irrespective of a window/interface in relation to which the cursor is displayed. Alternatively, the cursor's behavior could be window/interface dependent, and a user could define cursor related settings for each window separately. In such an embodiment, different configuration settings could enable a user to define the desired cursor behavior or could be hard coded as explained earlier. Using a trading application as an example, when a user drags a cursor over a window corresponding to the trading application, P/L data could be displayed in relation to the cursor. Also, as each window over which the cursor is positioned could display data corresponding to a different tradeable object, the P/L data displayed in relation to the cursor could dynamically change to represent a trader's P/L with respect to a tradeable object corresponding to the window over which the cursor is positioned. Then, as the cursor is dragged over a window corresponding to another application, the cursor may revert back to a different behavior. For example, if the cursor is first positioned over a window corresponding to a trading application and then is moved to a window corresponding to a different application, e.g., an e-mail window, the data linked and displayed in relation to the cursor could be modified based on the predefined settings. It should be understood that many different configurations for the cursor's behavior could be defined and used as well.

B. Textual Information

According to one example embodiment related to a trading environment, different types of information could be displayed in relation to a cursor, including trader related information, market related information, news, charts, or any other information that could assist a trader in making his trading decisions. According to one example embodiment, the displayed information could be in the format of textual information. Textual information related to the trader's data could include trader's global net position, per-tradeable object net position, per-account net position, global profit/loss ("P/L"), per-tradeable object P/L, per-account P/L, some other risk related values, or yet some other values of interest. Market related information in the textual format could include a last traded price for a tradeable object, a current inside market for a tradeable object, other bid/ask prices, market quantities, a time until market close/open for a tradeable object, an exchange time to market close/open, or yet some other values selected by a user. The textual information displayed in relation to a cursor could also be linked to a risk management trading application to provide risk alerts for one or more tradeable objects being traded by a trader or for one or more accounts that are used by the trader for trading.

It should be understood that textual information displayed in relation to a cursor could be based on various other data types, such as news alerts or news feeds. Additionally, the textual information could include values or yet some other indicators that are determined based on formulas entered by a user via Excel, or some other application. In such an embodiment, the values could be calculated by the external applications based on data from other sources, such as based on market data corresponding to one or more tradeable object. The calculated values could then be provided to the cursor control application for display or use in relation to a cursor.

C. Graphical Indicators

In addition to or in place of the textual information that could be displayed in relation to a cursor, graphical indicators or even the cursor itself could be used as well to convey information to a user. The graphical indicators could include various user-configured icons, symbols, or even charts/graphs that could convey desired information to a user. For example, an arrow pointing up or down could be periodically displayed in relation to a cursor as the market corresponding to one or more pre-selected tradeable objects moves up or down. Further, the cursor's shape, size, or color could vary to convey pre-selected information. For example, the cursor's color could vary from blue to red based on the market movement corresponding to a pre-selected tradeable object, with blue indicating an upward market movement and red indicating the market moving down. As another example, a cursor's color could change based on a predefined color scale as a trader's net position increases or decreases.

While, graphical and textual indicators could be displayed independently of each other, it should be understood that the combination of the indicators could be used as well. For example, when an inside market is displayed in relation to a cursor, an arrow pointing up or down could be displayed as well to indicate if the market has gone up or down compared to the last inside market. Alternatively, different colors, such as red or green, could be used for the textual data to indicate the same information. Additionally, the complexity of information displayed in relation to a cursor could be based on the user's preferences or the hard-coded configuration.

D. Display Settings

As explained earlier, data linked to a cursor could be displayed in relation to the cursor, and the displayed information could move along with the cursor's movement on one or more screens. It should be understood that the location where the information is displayed in relation to the cursor could be based on the user's preferences. Typically, as a user often focuses on a cursor while navigating through different applications or functions on a screen, the information associated with the cursor could be displayed directly next to the cursor.

Figure 5A:
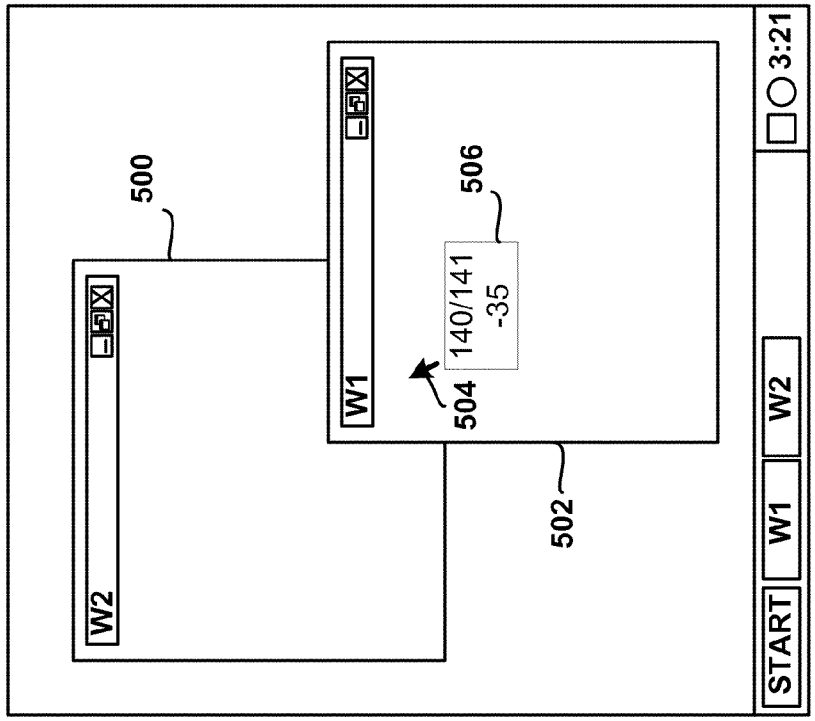
FIGS. 5A and 5B illustrate example embodiments for displaying information in relation to a cursor, and particularly, for displaying information in relation to a cursor within a single window of an application regardless of where the cursor is placed within the window.
Figure 5B:
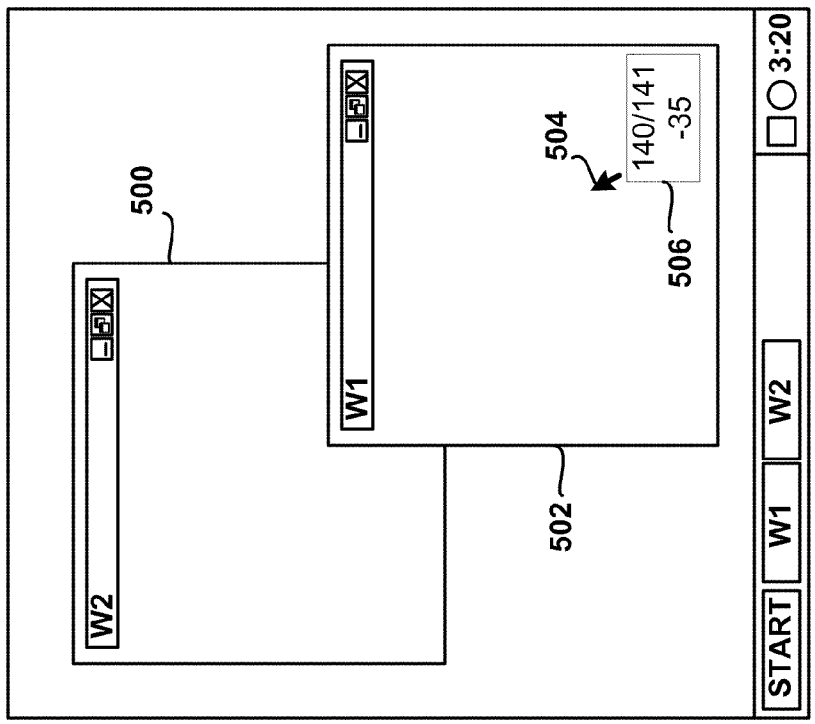

As mentioned earlier, the information linked to a cursor may remain linked and displayed in relation to the cursor regardless of the location of the cursor in relation to a window or interface corresponding to an application from which data is linked to the cursor, or a window or interface corresponding to different applications/operating systems. FIGS. 5A and 5B illustrate one example embodiment for displaying information in relation to a cursor where the cursor is moved to a different location in a window corresponding to an application that provides data that is linked to the cursor.

FIG. 5A shows two windows 500 and 502 with a cursor 504 located in a first location on the bottom right side of the window 502. Based on the illustrated embodiment, data linked to the cursor 504 is displayed on the bottom right side of the cursor 504, as shown at 506. While FIG. 5A illustrates one example position for displaying information in relation to a cursor, it should be understood that the linked information could be displayed to the left of the cursor 504, on the top/bottom of the cursor 504, or could be superimposed on it. Alternatively, information could be displayed at a location farther away from the actual cursor. Additionally, the location of displayed data in relation to a cursor could dynamically change based on a graphical interface or other information displayed underneath the cursor.

As the cursor 504 is moved to a second location in the window 502, the linked information 506 is moved along with the cursor, as shown in FIG. 5B. While FIG. 5B displays the linked information at the same location in relation to the cursor 504, it should be understood that the location of the displayed information could be changed as a user moves the cursor 504. For example, if information is displayed at the bottom right of the cursor 504, and a user moves the cursor 504 to the lower right side of the window 502, the location of the displayed information 506 could dynamically change as the cursor gets closer to the edge of the window 502, such as to the upper left side of the cursor 504, for example, to allow the displayed information remain visible. Different embodiments are possible as well.

Figure 6A:
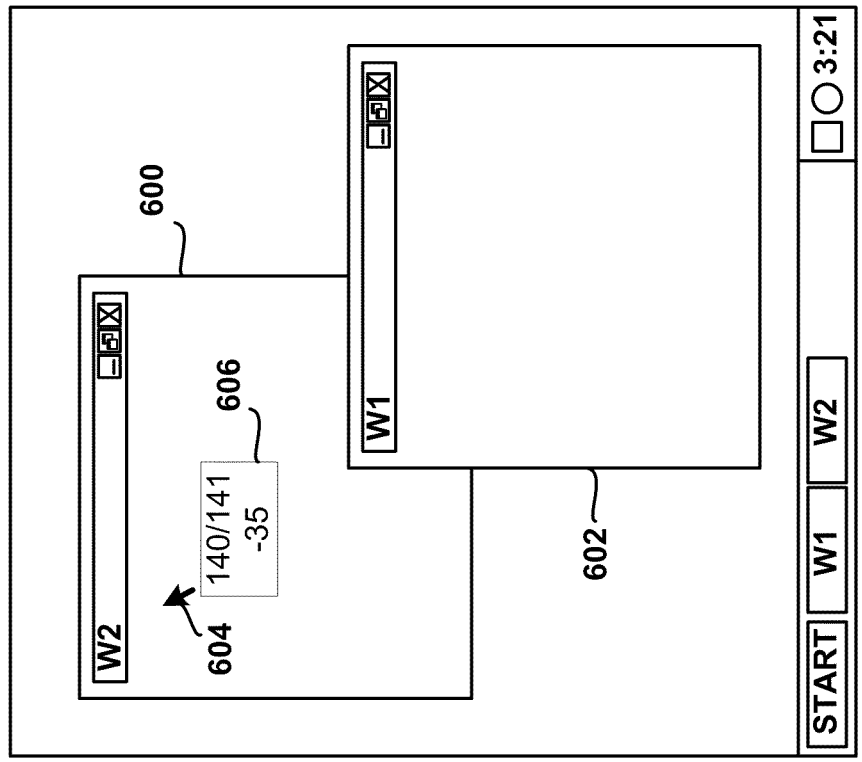
FIGS. 6A and 6B illustrate example embodiments for displaying information in relation to a cursor, and particularly, for displaying information in relation to a cursor as the cursor is dragged from a first window of a first application to a second window of the same or a different application.
Figure 6B:
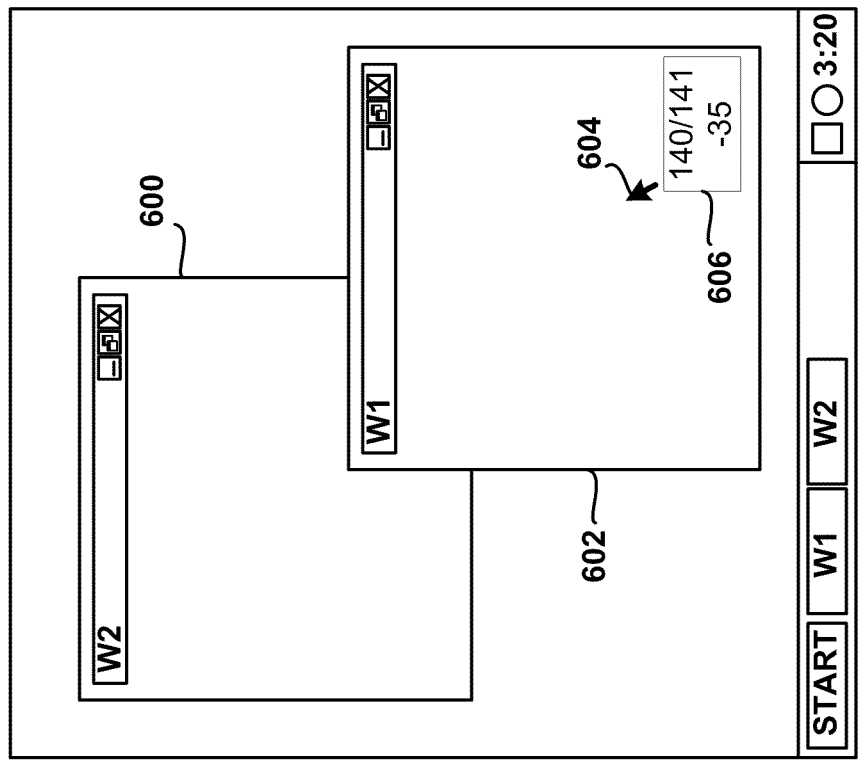

FIGS. 6A and 6B illustrate one example embodiment for displaying information in relation to a cursor where the cursor is moved to a different location in a window corresponding to a different application that the one providing data that is linked to the cursor.

FIG. 6A shows two windows 600 and 602 with a cursor 604 located in a first location on the bottom right side of the window 602. It will be assumed that the windows 600 and 602 correspond to two different applications, and the application associated with the window 602 provides data that is linked to the cursor 604. The linked data is displayed in relation to the cursor 604, as shown at 606. Now, as the cursor is moved to a different location in the window 600 corresponding to the second application, the information remains linked and is displayed in relation to the cursor, as shown in FIG. 6B. It should be understood that the same cursor behavior could occur if the cursor 606 was moved anywhere on the same or different screen, or if the cursor 606 was moved to a window or an interface associated with a different operating system.

E. Additional Embodiments

As briefly explained earlier, a user has the ability to pre-configure many different settings for a cursor, one of them being the information to be displayed in relation to the cursor. While the examples above referred to linking a single user-defined parameter or a number of parameters for display in relation to a cursor at any given point in time, in an alternative embodiment, the user could group one or more parameters into a plurality of configuration sets to be associated with the cursor. In such an embodiment, a user could control which data set is displayed in relation to the cursor by selecting different hotkeys predefined for different data sets. Alternatively, a middle mouse button could be used to overwrite the current set of configuration parameters associated with a cursor. For example, one data set could include a current net position and a trader's P/L related to a specific tradeable object, while the second data set could be associated with an inside market for one or more tradeable objects. In such an embodiment, a user could switch between the displayed data sets by simply using the middle wheel mouse button or by selecting a pre-configured key on a keyboard. It should be understood that the data activated with hot keys could be provided by the same or a different application. Different embodiment for controlling what is displayed in relation to a cursor could be defined as well.

According to another embodiment, the information displayed in relation to a cursor could automatically change based on preset criteria. It should be understood that many different criteria could be defined by a user. Some example criteria could include contextual information that is displayed under the current/previous location of a cursor on a screen or a recent change in one of the parameters to be displayed in relation to a cursor. For example, if a cursor is first positioned in relation to an interface that displays information related to a first tradeable object and then is moved to an interface associated with a second tradeable object or yet some other interface, such as when a user decides to search the Internet, the cursor could dynamically display information associated with the first tradeable object.

Additionally, a user could control the rate at which the information is displayed in relation to a cursor. In one example embodiment described earlier, rather than continually displaying the information in relation to a cursor, the information could periodically appear and then disappear upon detecting no changes in the attached data for a pre-defined time period. In such an embodiment, when a change in the attached information is detected, the change could temporarily overwrite the periodic display settings so that the new information could be displayed for a user.

According to yet another example embodiment, a user may wish to synchronize audio events with certain changes in parameters linked to a cursor. For example, an inside market corresponding to one or more tradeable objects may be displayed in relation to a cursor. In such an embodiment, a user may configure an audio alert to be played when one or more markets reach a certain price level. It should be understood that alerts could be used in relation to any user-defined value or event.

It will be apparent to those of ordinary skill in the art that methods involved in the system and methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:

monitoring by a computing device linked data to determine if the linked data has changed, wherein the linked data is linked from a trading application as specified by configuration data from a user;

generating by the computing device a visual representation of the linked data, wherein the visual representation of the linked data is generated independent of a location of a cursor on a screen;

displaying by the computing device the visual representation of the linked data in relation to the cursor;

updating by the computing device the visual representation of the linked data when the linked data changes;

receiving by the computing device a command moving the cursor from a first location to a second location, wherein the first location is in a first window associated with a first application, wherein the second location is in a second window associated with a second application, wherein the first application is different from the second application, wherein the first and second applications are different from the trading application, wherein the visual representation of the linked data is displayed without modification of the first application or the second application, wherein the visual representation of the linked data is continuously displayed in relation to the cursor as the cursor is moved from the first location in the first window of the first application to the second location in the second window of the second application based on the command; and temporarily stopping by the computing device the display of the visual representation of the linked data in relation to the cursor after a predefined time period until a change in the linked data is detected.

2. The method of claim 1, wherein the linked data includes market data related to a tradeable object being traded at an electronic exchange.

3. The method of claim 1, wherein the linked data includes trader related data.

4. The method of claim 1, wherein the linked data includes news or chart data.

5. The method of claim 1, wherein the visual representation of the linked data includes a tool tip.

6. The method of claim 1, wherein the visual representation of the linked data includes a graphical representation.

7. The method of claim 1, wherein the visual representation of the linked data includes a textual representation.

8. The method of claim 1, further including changing a format of the cursor to convey the linked data.

9. The method of claim 8, wherein the format of the cursor includes at least one of a shape, color, and size of the cursor.

10. The method of claim 1, further including:
receiving by the computing device a request to link the linked data from a different source.

11. The method of claim 10, wherein the different source includes different data from the trading application.

12. The method of claim 10, wherein the different source includes a second application.

13. The method of claim 1, wherein the computing device includes the screen.

* * * * *